United States Patent
Mehrotra

(10) Patent No.: US 7,072,512 B2
(45) Date of Patent: Jul. 4, 2006

(54) SEGMENTATION OF DIGITAL VIDEO AND IMAGES INTO CONTINUOUS TONE AND PALETTIZED REGIONS

(75) Inventor: Sanjeev Mehrotra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 10/202,223

(22) Filed: Jul. 23, 2002

(65) Prior Publication Data

US 2004/0017939 A1   Jan. 29, 2004

(51) Int. Cl.
*G06K 9/34*   (2006.01)

(52) U.S. Cl. .................. 382/173; 382/232; 382/233

(58) Field of Classification Search ........... 382/173, 382/194, 165, 232, 233, 239, 243

See application file for complete search history.

(56) References Cited

U.S. PATENT DOCUMENTS

| | | | |
|---|---|---|---|
| 5,043,919 A | | 8/1991 | Callaway et al. |
| 5,258,836 A | | 11/1993 | Murata |
| 5,266,941 A | | 11/1993 | Akeley et al. |
| 5,339,172 A | * | 8/1994 | Robinson .................. 382/173 |
| 5,394,170 A | | 2/1995 | Akeley et al. |
| 5,432,870 A | * | 7/1995 | Schwartz .................. 382/232 |
| 5,517,327 A | | 5/1996 | Nakatani et al. |
| 5,586,200 A | | 12/1996 | Devaney et al. |
| 5,594,504 A | | 1/1997 | Ebrahimi |
| 5,598,215 A | | 1/1997 | Watanabe |
| 5,764,814 A | | 6/1998 | Chen et al. |
| 5,912,991 A | | 6/1999 | Jeon et al. |
| 5,946,419 A | | 8/1999 | Chen et al. |
| 6,026,182 A | | 2/2000 | Lee et al. |
| 6,075,875 A | | 6/2000 | Gu |
| 6,188,777 B1 | | 2/2001 | Darrell et al. |
| 6,226,407 B1 | | 5/2001 | Zabih et al. |
| 6,400,831 B1 | | 6/2002 | Lee et al. |
| 6,421,738 B1 | | 7/2002 | Ratan et al. |
| 6,573,915 B1 | | 6/2003 | Sivan et al. |
| 6,650,705 B1 | | 11/2003 | Vetro et al. |
| 6,654,419 B1 | | 11/2003 | Sriram et al. |
| 6,711,278 B1 | | 3/2004 | Gu et al. |
| 6,714,180 B1 | * | 3/2004 | Jones .................. 345/89 |
| 6,721,454 B1 | | 4/2004 | Qian et al. |
| 6,728,317 B1 | | 4/2004 | Demos |
| 6,870,945 B1 | | 3/2005 | Schoepflin et al. |
| 6,904,759 B1 | | 6/2005 | Shoulders |
| 6,959,104 B1 | | 10/2005 | Rajagopal et al. |
| 2001/0048753 A1 | | 12/2001 | Lee et al. |
| 2002/0176624 A1 | | 11/2002 | Kostrzewski et al. |

(Continued)

OTHER PUBLICATIONS

Chaddha, "Segmentation-Assisted Compression of Multimedia Documents," *Proc. of the 29th Asilomar Conf. on Signals, Systems and Computers*, pp. 1452-1456 (1996).

(Continued)

*Primary Examiner*—Phuoc Tran
(74) *Attorney, Agent, or Firm*—Klarquist Sparkman, LLP

(57) ABSTRACT

For encoding of mixed-content images containing palettized and continuous-tone content, continuous tone content regions in the image are detected and separated. Continuous tone content segmentation classifies pixels as continuous tone content by counting a number of unique pixel values within a pixel neighborhood. Pixels whose count exceeds a threshold are classified as continuous tone content. The technique further scans the image for regions of high continuous tone pixel density. The segmented continuous-tone and palettized content can be encoded separately for efficient compression, and then reassembled at decompression.

31 Claims, 12 Drawing Sheets

U.S. PATENT DOCUMENTS

| | | |
|---|---|---|
| 2003/0044045 A1 | 3/2003 | Schoepflin et al. |
| 2003/0072479 A1 | 4/2003 | Totterman et al. |
| 2003/0165254 A1 | 9/2003 | Chen et al. |
| 2004/0228530 A1 | 11/2004 | Schwartz et al. |
| 2004/0234136 A1 | 11/2004 | Zhu et al. |
| 2005/0074140 A1 | 4/2005 | Grasso et al. |
| 2005/0105768 A1 | 5/2005 | Yang et al. |

OTHER PUBLICATIONS

Perlmutter et al., "Text Segmentation in Mixed-Mode Images Using Classification Trees and Transform Tree-Structured Vector Quantization," *Proc. of the IEEE International Conf. on Acoustics, Speech and Signal Processing*, pp. 2231-2234 (May 1996).

Queiroz et al., "Optimizing Block-Thresholding Segmentation for Multilayer Compression of Compound Images," *IEEE Transactions on Image Processing*, vol. 9, No. 9, pp. 1461-1471 (Sep. 2000).

Said et al., "Simplified Segmentation for Compound Image Compression," *1999 International Conf. on Image Processing (ICIP '99)*, vol. 1, pp. 229-233, Kobe, Japan (Oct. 1999).

Biggar et al., "Segmented Video Coding", *IEEE Int. Conf on Acoustics, Speech and Sig. Proc., ICASSP-88, New York*, pp. 1108-1111 (Apr. 1988).

Black, "Combining Intensity and Motion for Incremental Segmentation and Tracking Over Long Image Sequences," *ECCV '92*, Santa Margherita, Italy, pp. 485-493 (May 1992).

Brady et al., "Object Detection and Tracking Using An Em-Based Motion Estimation and Segmentation Framework," *ICIP '96*, Lausanne, Switzerland vol. 1, pp. 925-928 (Sep. 1996).

Burt et al., "Segmentation and Estimation of Image Region Properties Through Cooperative Hierarchical Computation," *IEEE Transactions on Systems, Man, and Cybernetics*, vol. SMC-11, No. 12, pp. 802-809 (Dec. 1981).

Canny, "A Computational Approach to Edge Detection," *IEEE Transactions on Pattern Analysis and Machine Intelligence*, vol. PAMI-8, No. 6, pp. 679-698 (Nov. 1986).

Chaddha et al., "Text Segmentation Using Linear Transforms", *1996 Conference Record of the 29th Asilomar Conference on Signals, Systems and Computers*, vol. 2, 1996: 1447-1451.

Chaddha et al., "Text Segmentation Using Mixed-Mode Images", *1994 Conference Record of the 28th Asilomar Conference on Signals, Systems and Computers*, vol. 2, 1994: 1356-1361.

Chen et al., "Image-Segmentation as an Estimation Problem," *Computer Graphics and Image Processing*, vol. 12, pp. 153-172 (1980).

Cover et al., "Nearest Neighbor Pattern Classification," *IEEE Transactions on Information Theory*, vol. IT-13, No. 1, pp. 21-27 (Jan 1967).

Deriche et al., "Tracking Line Segments," *ECCV'90*, pp. 259-268 (1990).

Gill et al., "Creating High-Quality Content with Microsoft Windows Media Encoder 7," 4 pp. (2000). [Dowloaded from the World Wide Web on May 1, 2002.].

Gu et al., "Combined Gray-Level and Motion Segmentation for Very Low Bit-Rate Coding," *SPIE*, vol. 2451, pp. 121-129 (Mar. 1995).

Haralick et al., "Image Segmentation Techniques," *Computer Vision, Graphics and Image Processing*, vol. 29, pp. 100-132 (1985).

Horowitz et al., "Picture Segmentation by a tree traversal algorithm," *J. ACM*, vol. 23, No. 2, pp. 368-388 (1976).

Li et al., "Optimal Linear Interpolation Coding for Server-Based Computing," *Proc. IEEE Int'l Conf. on Communications*, 5 pp. (Apr.-May 2002).

Matthias, "An Overview of Microsoft Windows Media Screen Technology," 3 pp. (2000). [Dowloaded from the World Wide Web on May 1, 2002.].

Meyer, "Color Image Segmentation," *4th International Conference on Image Processing and its Applications*, pp. 303-306 (May 1992).

OPTX International, "OPTX Improves Technology-Based Training with Screen Watch ™3.0. Versatile Screen Capture Software Adds High Color and Live Webcast Support," 1 p., document marked February 15, 2001 [downloaded from the World Wide Web on Sep. 22, 2005].

OPTX International "OPTX International Marks One Year Anniversary of Screen Watch With Release of New 2.0 Version," 1 p., document marked May 16, 2000 [downloaded from the World Wide Web on Sep. 22, 2005].

OPTX International, "New Screen Watch™ 4.0 Click and Stream™ Wizard From OPTX International Makes Workplace Communication Effortless," 1 p., document marked Sep. 24, 2001 [downloaded from the World Wide Web on Sep. 22, 2005].

Palmer et al., "Shared Desktop: A Collaborative Tool for Sharing 3-D Applications Among Different Window Systems," *Digital Tech. Journal*, v. 9, No. 3, pp. 42-49 (1997).

Pipitone et al., "Tripod operators for recognizing objects in range images: rapid rejection of library objects," *Proceedings of the 1992 IEEE International Conference on Robotics and Automation*(May 1992).

Salembier et al., "Segmentation-Based Video Coding System Allowing the Manipulation of Objects," *IEEE Transactions on Circuits and Systems for Video Technology*, vol. 7, No. 1, pp. 60-73 (Feb. 1997).

Schaar-Mitrea et al., "Hybrid Compression of Video with Graphics in DTV Communication Systems," *IEEE Trans. on Consumer Electronics*, pp. 1007-1017 (2000).

Techsmith Corporation, "Techsmith Camtasia Screen Recorder SDK," 2 pp. (2001).

Techsmith Corporation, "Camtasia Feature of the Week: Quick Capture," 2 pp. (Downloaded from the World Wide Web on May 9, 2002; document dated Jan. 4, 2001).

Techsmith Corporation, "Camtasia Screen Recorder SDK DLL API User Guide," version 1.0, 66 pp. (2001).

Techsmith Corporation, "Camtasia v3.0.1 - README.TXT," 19 pp. (Jan. 2002).

Zhong et al., "AMOS: an active system for MPEG-4 video object segmentation," *ICIP '98*, Chicago, vol. 2, pp. 647-651 (1998).

\* cited by examiner

Software 380 Implementing a Screen Capture Tool with Palettized/Continuous Tone Content Segmentation

Figure 9

900 — Rectangle 2 (after removing shaded section rectangle 3) considered better if
$Density_3 <= T_{min} = 0.1$
Rectangle 1 considered better if
$Density_3 >= T_{max} = 0.5$
If $T_{min} < Density_3 < T_{max}$, then
Rectangle 2 considered better if
$Density_2 > Density_1$
Rectangle 1 considered better if
$Density_1 > Density_2$
If $Density_1 = Density_2$,
Rectangle 1 considered better since it has larger area.

SEGMENTATION OF DIGITAL VIDEO AND IMAGES INTO CONTINUOUS TONE AND PALETTIZED REGIONS

TECHNICAL FIELD

The invention relates to digital video and image compression, and more particularly relates to segmentation into continuous tone and palettized regions.

BACKGROUND

Compression techniques for video and images generally are best suited to particular types of image content, and are less effective or even ineffective on other types. For example, one common image content type is generally referred to as "continuous tone." Continuous tone content is typified by photographic images, where color perceptually varies continuously across the image. With continuous tone content, the color depth or resolution of a pixel (i.e., the number of possible color values for the pixel) in the image generally is comparatively larger than the number of pixels (spatial resolution) of the image. A common example may be a digital photograph having 800×600 pixel spatial resolution (i.e., 480,000 pixels), where each pixel has a 24-bit color value (allowing 16,777,216 possible colors).

On the other hand, another common image content type is referred to herein as palettized image content. Palettized image content is perhaps most typically encountered in computer screen displays, where the graphical user interface may generally consist of window areas containing generally flat color backgrounds, icons and text. The colors of such palettized content displays are selected from a smaller sub-set of discrete colors (referred to as the color palette), which in some computers may be mapped to the larger color space of displayable colors via a color look-up table or the like. In a simple case, there may be only two colors present in the palettized image. For palettized image content, the number of possible colors that the pixels can assume is small compared to the number of pixels. A common example may be an 800×600 screen display, where pixels have 8-bit color values (permitting only 256 discrete colors).

Many common image compression techniques apply a block-based linear transform (e.g., the discrete cosine transform (DCT) used in the JPEG, MPEG and H.261 compression standards) with quantization of transform coefficients to achieve lossy compression of image data. These techniques are well suited to compressing continuous tone image content, but have drawbacks when applied to palettized content. One drawback to these transform-based compression techniques when applied to palettized content is that the quantization of high frequency transform coefficients has the effect of distorting or blurring discontinuities in color such as at edges of text, window and icon button borders and the like in palettized content, because quantization tends to blur such locations of high color variation. The edge blurring can be readily perceptible to the viewer, resulting in significant degradation of image quality, unless the quantization (and resulting compression) is significantly reduced.

Other image compression techniques, such as those based on adaptive entropy encoding techniques (e.g., run length encoding, Huffman codes, etc.), are well suited to compressing palettized image content. In general, these adaptive entropy encoding techniques achieve compression by utilizing encoding schemes that assign codes whose length relates inversely to the frequency of occurrence of the encoded information (e.g., assigning shorter codes to more frequently occurring color values, or runs of color values). Pixels in continuous tone content, however, tend to vary in color continuously across the image, so that the continuous tone content generally does not contain highly repetitive pixel colors to compress via shorter encodings. Consequently, these adaptive entropy encoding techniques are not well suited to compressing continuous tone content.

Images containing a mixture of continuous tone content and palettized content are now quite common. Examples include screen capture images, web pages, educational and training videos (especially those containing screen capture images or web pages), and business presentations, among others. In the case of screen capture images, it is now common for photographs to be used as background images of the desktop display or in windows of a computer's graphical user interface. Web pages often include photographs interspersed among text and other palettized content.

SUMMARY

Segmentation of video and images into palettized and continuous tone regions for compression using a compression technique better suited to the respective region results in better overall compression performance on mixed content video and images. In a segmentation technique described herein, palettized and continuous tone content are distinguished based on whether a pixels' neighbors are different colors.

Most image content has some structure. In other words, pixels typically do not have random colors, but rather pixels group together to form lines, shapes, text, etc. In palettized content, a pixel will more typically have neighboring pixels that take on the same value because there are very few different colors in the image. In a flat tone background for example, all neighboring pixels will be of the same color. Similarly for text, many neighboring pixels are the same color. This generally is not the case for continuous tone content, where objects in the image more typically vary as a color gradient than are flat-toned. Typically, most continuous tone content pixels' neighbors will be of a different color.

In one segmentation technique described herein, the segmentation technique first produces a count for pixels in the image of the number of unique colors in the individual pixels' neighborhood. Then, the pixels are classified as palettized or continuous tone content based on the count of unique colors in their neighborhood. Pixels with a low count are classified as palettized content, whereas pixels with a higher count of neighborhood colors are classified as continuous tone content.

The segmentation technique then groups the classified pixels into larger regions of continuous tone or palettized content. In one implementation, the image is first divided into smaller regions. The sides of a region are then iteratively adjusted based on a density of pixels that are classified as the respective content type (e.g., density of continuous tone content pixels).

The segmented regions of the image can then be compressed using a suitable compression technique for its content type.

Additional features and advantages will be made apparent from the following detailed description of illustrated embodiments, which proceeds with reference to the accompanying drawings.

BRIEF DESCRIPTION OF THE DRAWINGS

FIG. 9 is a listing of a pseudo-code procedure for selectively adjusting sides of a continuous tone region in the process of FIGS. 7 and 8.

DETAILED DESCRIPTION

In one embodiment described herein, techniques for segmentation into continuous tone and palettized content regions are incorporated into an encoder/decoder ("codec") for mixed-content images. For an illustrative application involving compression of mixed-content images, the codec is implemented in a screen capture tool, which provides means for a computer user to record an image or series of images displayed on his or her computer monitor. The screen capture image is sometimes called a screen image, screen shot, screen frame, capture image, etc. For example, the user might use the recorded screen image in a help manual, report, training video or other documents to show the results displayed on the computer monitor at a particular time. In alternative embodiments, the described text detection and segmentation techniques can be applied to other applications involving separation of text and continuous tone content in mixed mode images, such as desktop publishing, presentation, photograph and video editing, remote terminal access, remote application sharing, and like other software applications.

Figure 1A:
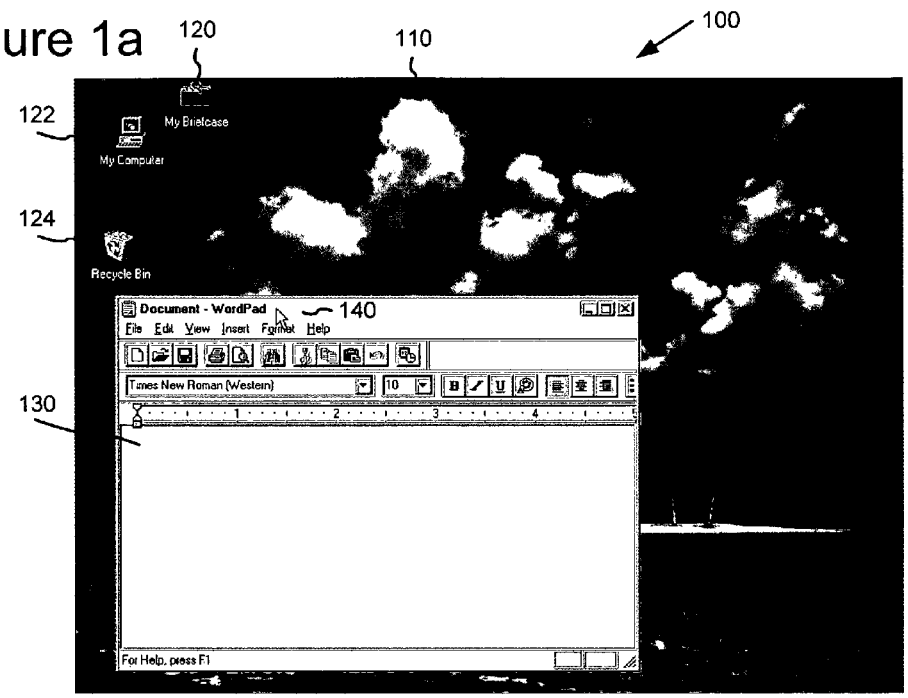
FIGS. 1a–1c illustrate screen images of a computer desktop environment that can be captured or recorded using a screen capture tool incorporating continuous tone/palettized content segmentation techniques.

FIG. 1a illustrates an example of a screen image (100) of a computer desktop environment that may be recorded using the screen capture tool. This exemplary screen image (100) depicts the entire desktop, but other examples of screen images that may be selected for recording using the screen capture tool can include only the window (130) or some other portion of the desktop. A cursor graphic (140) overlays the window (130), and several icon graphics (120, 122, 124) overlay a background (110). The background (110) of the illustrated screen image consists of a continuous-tone photographic image. The icons (120, 122, 124) include text labels that overlay the background image. In general, the desktop can include multiple windows, toolbars, menus, and other graphical interface features.

For some applications, a user records a series of screen images to show how screen content changes. The user might use the series of screen images within an instructional video for job training or remote instruction. Many companies that provide video-editing solutions also provide screen capture tools.

Figure 1B:
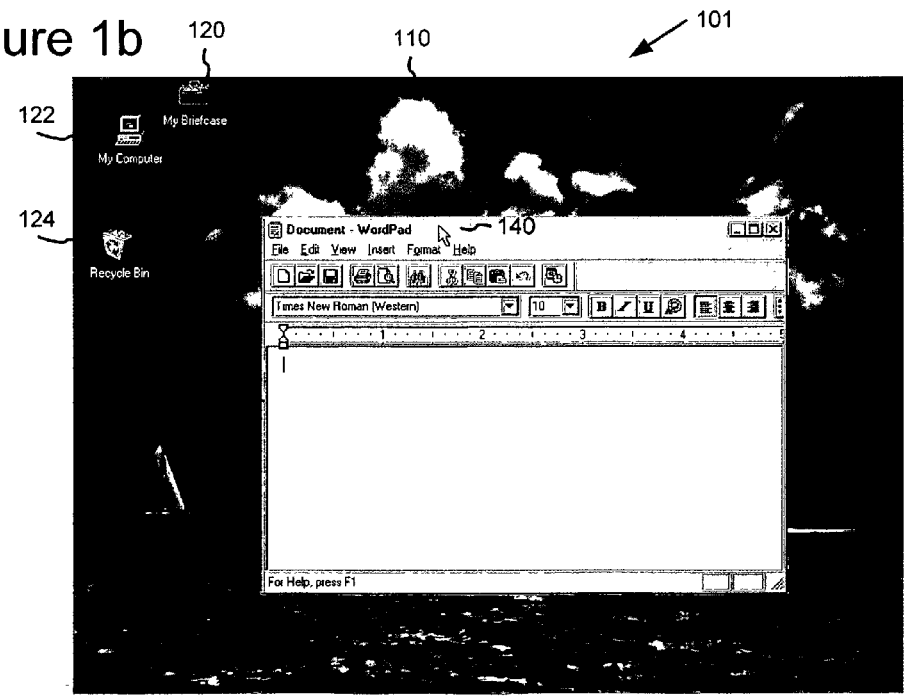
Figure 1C:
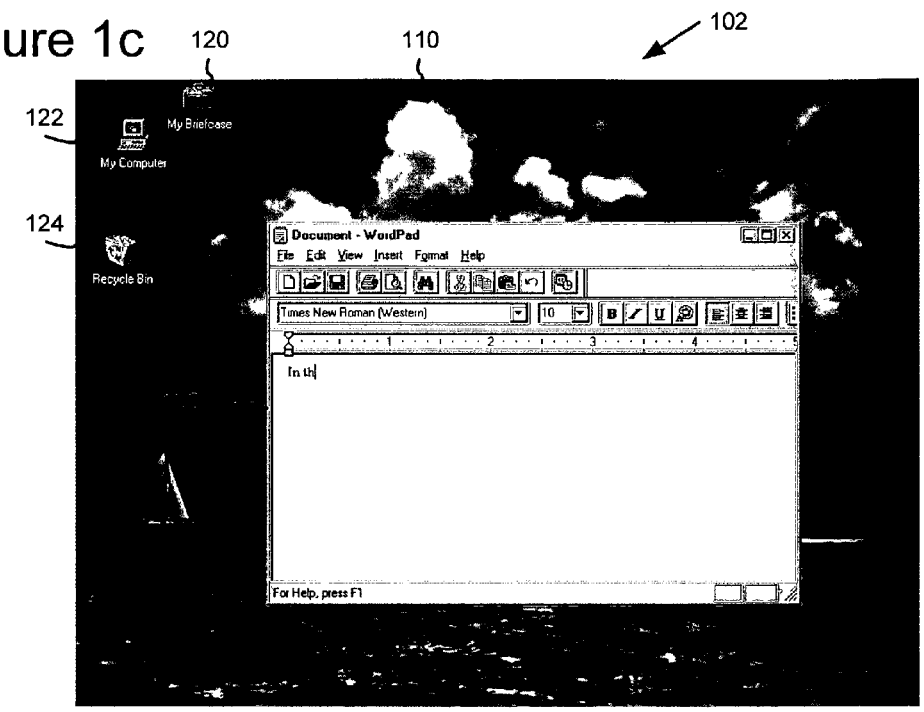

FIGS. 1b and 1c show screen images (101, 102) following the screen image (100) of FIG. 1a in a series. Much of the screen content shown in FIGS. 1a–1c is identical. Screen content such as the background (110) and icon graphics (120, 122, 124) usually does not change from frame to frame. On the other hand, the cursor graphic (140) often changes location and appearance as the user manipulates a mouse or other input device, and the contents of the window (130) often change as a user types, adds graphics, etc. FIG. 1b shows the cursor graphic (140) and the window (130) changing locations as the user drags the window (130) across the desktop, which in turn changes which portions of the background (110) are exposed. FIG. 1c shows the contents of the window (130) changing after typing by the user, while the cursor graphic (140) has disappeared.

When a series of screen images is captured in quick succession (for example, 15 frames per second) or when a window displays slowly changing content, changes in screen content from frame to frame tend to be small. On the other hand, when screen capture is less frequent (for example, 1 frame per second) or when a window displays quickly changing content such as a video game or motion picture, changes from frame to frame tend to be more pronounced. Dramatic changes in screen content can also occur, for example, when windows or menus are opened, closed, moved, resized, etc.

The quality of a series of screen images depends on several factors. Higher resolution and higher frame rate increase quality, but also increase performance costs. To understand how quality affects performance of a screen capture tool, it helps to understand how a computer represents and captures screen images.

Computer Representation of Screen Images

A single rectangular screen image includes rows of picture elements ["pixels"] with color values. The resolution of the screen image depends on the number of pixels and the color depth. The number of pixels of a rectangular screen image is usually expressed in terms of the dimensions of the rectangle, for example, 320×240 or 800×600. For images displayed at the same size, higher resolution gives a clearer picture. The color depth is usually expressed as a number of bits for a color value per pixel, which affects the number of possible colors for an individual pixel. Some conventional color depths are 1, 8, 16, and 24 bits. If the color depth is 8 bits, for example, there are $2^8$=256 possible colors per pixel. The 256 values can be shades of gray from white to black, or indices to a color palette that stores 256 different 24-bit colors in the screen image. A screen image represented by pixels and stored as a collection of bits, with each pixel having a color value, is an example of a bitmap.

The frame rate of a series of screen images (i.e., resolution in time) is usually expressed in terms of frames per second ["fps"]. Some conventional frame rates are 2, 10, 15, and 30 fps. For changing screen content, higher frame rate results in smoother playback of the content.

Quality affects the number of bits needed to represent a series of screen images, which in turn affects the cost of capturing, processing, storing, and transmitting the information. Table 1 shows the bit rates (bits per second) of several uncompressed series of screen images of different qualities.

TABLE 1

Bit rates of series of screen images of different quality.

| Spatial Resolution (pixels h × v) | Color Depth (bits) | Frame Rate (fps) | Bit Rate (bits per second) |
|---|---|---|---|
| 320 × 240 | 8 | 2 | 1,228,800 |
| 320 × 240 | 24 | 2 | 3,686,400 |
| 800 × 600 | 24 | 2 | 23,040,000 |
| 800 × 600 | 24 | 10 | 115,200,000 |

Display and Capture of Screen Images

Most computer systems include a display card, which stores information for output to a visual display unit (e.g., monitor). Common terms for display card include video card, graphics card, graphics output device, display adapter, video graphics adapter, etc.

In one common scenario, a computer system loads device driver software for a display card into system memory (usually some type of Random Access Memory ["RAM"]). The computer system accesses various features of the display card through device driver software.

On the display card, a frame buffer (which can be some type of RAM) stores pixel information from which the visual display unit is refreshed. In addition to the frame buffer, the display card can include a graphics processor, graphics accelerator or other hardware to make rendering more efficient.

A digital to analog converter converts the digital information in the frame buffer to an analog form, and the analog information is transmitted to the display unit. Conventionally, screen content is refreshed pixel-by-pixel across a row of the display unit, the rows are refreshed row-by-row from top to bottom, and the process repeats such that the entire display is refreshed 60 or more times per second. Many types of frame buffers are dual ported—while the system writes from system memory to a frame buffer, the display can read from the frame buffer to refresh current screen content.

In a screen capture operation, information is transferred from the display card frame buffer back to system memory of the computer system. Device drivers and/or other layers of software in the computer system often facilitate such transfer by supporting a Bit Block Transfer ["BitBlt"] operation, which a software application can utilize. In a BitBlt operation, a computer system transfers pixel information from a source (e.g., display card frame buffer) to a destination (e.g., system memory). In some implementations, the software application can specify the coordinates and dimensions of a rectangle in the screen or window for which information should be retrieved, up to the entire screen/window. Depending on implementation, the software application can specify other parameters as well, for example, source and destination.

An entire screen area rarely changes every frame. Instead, screen areas are fairly static, and there is no need to capture the entire screen area at every frame. Accordingly, the illustrated screen capture tool identifies changes in screen content that require transfers from a display card frame buffer to system memory. At the same time, the screen capture tool prioritizes transfers within system memory, for example, use of pixel information from a previously captured screen area for a current screen area.

The screen capture tool uses BitBlt operations to transfer pixel information from a display card frame buffer to system memory in a computer system with a display card. Alternatively, the screen capture tool uses another operation to retrieve the pixel information for a screen area and/or operates in another environment. The screen capture tool is not limited to a particular operating system, computing platform, software tool, or hardware device.

Computing Environment

Figure 2:
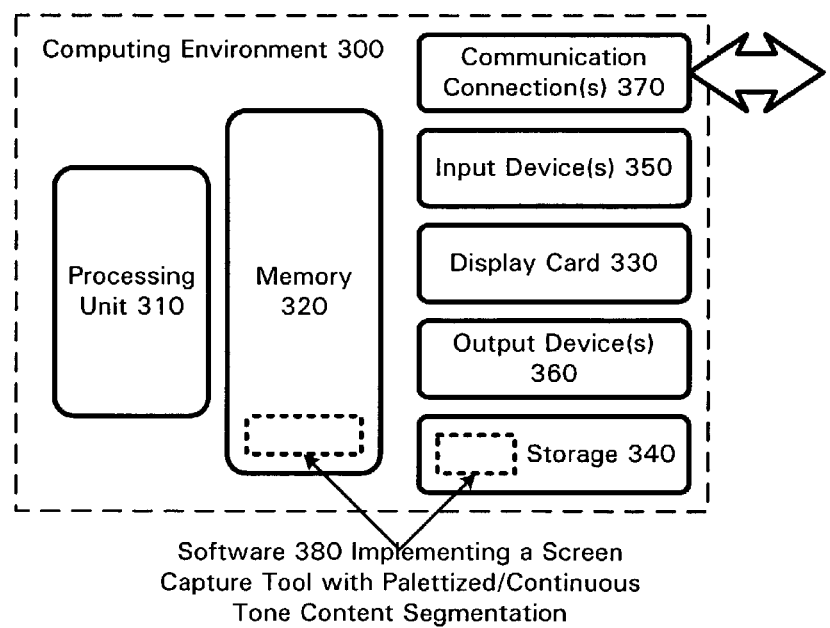
FIG. 2 is a block diagram of a suitable computing environment in which a screen capture tool incorporating continuous tone/palettized content segmentation techniques is implemented.

FIG. 2 illustrates a generalized example of a suitable computing environment (200) in which described embodiments may be implemented. The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and memory (220). The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing a screen capture encoder and/or decoder with segmentation of continuous tone and palettized content.

The computing environment (200) also includes a display card (230). The display card (230) (alternatively called the video card, graphics card, graphics output device, display adapter, video graphics adapter, etc.) delivers output to a visual display unit such as a computer monitor. The display card (230) includes a frame buffer that stores pixel information for display on a screen. The frame buffer is often some type of RAM on the display card (230), but can instead be some other kind of memory and/or not physically located on the display card itself. The display card (230) can include a graphics processor, graphics accelerator, and/or other specialized display hardware.

Typically, operating system software (not shown) provides an operating environment for other software executing in the computing environment (200), and coordinates activities of the components of the computing environment (200). In addition, display driver software allows access to various features of the display card (230). The display driver software can work in conjunction with one or more layers of operating system software through which access to the features of the display card (230) is exposed. For example, through such features, a screen capture tool might retrieve pixel information from the frame buffer of the display card (230) for screen content currently displayed on a screen of a visual display unit.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200).

The storage (240) may be removable or non-removable, and includes magnetic disks, magnetic tapes or cassettes, CD-ROMs, CD-RWs, DVDs, or any other medium which can be used to store information and which can be accessed within the computing environment (200). The storage (240) stores instructions for the software (280) implementing a screen capture encoder and/or decoder with segmentation of continuous tone and palettized content.

The input device(s) (250) may be a touch input device such as a keyboard, mouse, pen, or trackball, a voice input device, a scanning device, sound card, TV tuner/video input card, or other device that provides input to the computing environment (200).

The output device(s) (260) may be a visual display unit, printer, speaker, CD-writer, or other device that provides output from the computing environment (200). A visual display unit presents screen content based upon output delivered from the display card (230).

The communication connection(s) (270) enable communication over a communication medium to another computing entity. The communication medium conveys information such as computer-executable instructions, compressed captured screen area information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various implementations. Computer-executable instructions for program modules may be executed within a local or distributed computing environment.

For the sake of presentation, the detailed description uses terms like "capture," "encode," and "decode" to describe computer operations in a computing environment. These terms are high-level abstractions for operations performed by a computer, and should not be confused with acts performed by a human being. The actual computer operations corresponding to these terms vary depending on implementation.

II. Screen Capture Tool

A screen capture tool captures screen content such as a desktop environment, application windows, a slideshow, and video, and (optionally) captures audio content as well. To reduce or even eliminate BitBlt usage when capturing a screen area, the screen capture tool uses pixel information already in system memory, for example, pixel information from a previously captured screen area. The screen capture tool then uses BitBlt operations to get pixel information only for selected regions of the new screen area.

The screen capture tool can be a standalone software application, a feature of a multimedia production package (e.g., video editing software, audio/video production kit), a plug-in, or some other form of software and/or hardware product. The screen capture tool typically lets a user set high-level options for a capture session (e.g., media sources and types, quality, resultant bit rate, buffer size, and output stream or file location). The screen capture tool can also present low-level options to the user, such as frame rate, output resolution, time distortion (e.g., slow motion). The output of the screen capture tool can be saved to a file or streamed over a network.

The screen capture tool can include or be combined with a compression tool to reduce the bit rate of a series of captured screen areas. The compression tool can be a screen capture encoder (for lossless encoding) or a video encoder (for lossy, but lower bit rate encoding) selected from a group of available encoders.

In some cases, a captured screen area shows an entire screen, for example, an entire desktop environment. In other cases, the screen area shows a selected window or arbitrary region of the desktop environment. In general, a screen area depicts some or all of the screen content presented or prepared for presentation in a desktop environment or other graphical user interface for a computer system.

The frame rate for a series of captured screen areas may be fixed for the duration of the series, for example, according to a wizard-defined setting, user-specified setting, or the capabilities of the computing environment. Or, the frame rate may vary during screen capture for all or part of a screen area so as to increase temporal resolution when possible and decrease temporal resolution (even dropping frames) if necessary.

Exemplary Screen Capture Encoder and Decoder

Figure 3:
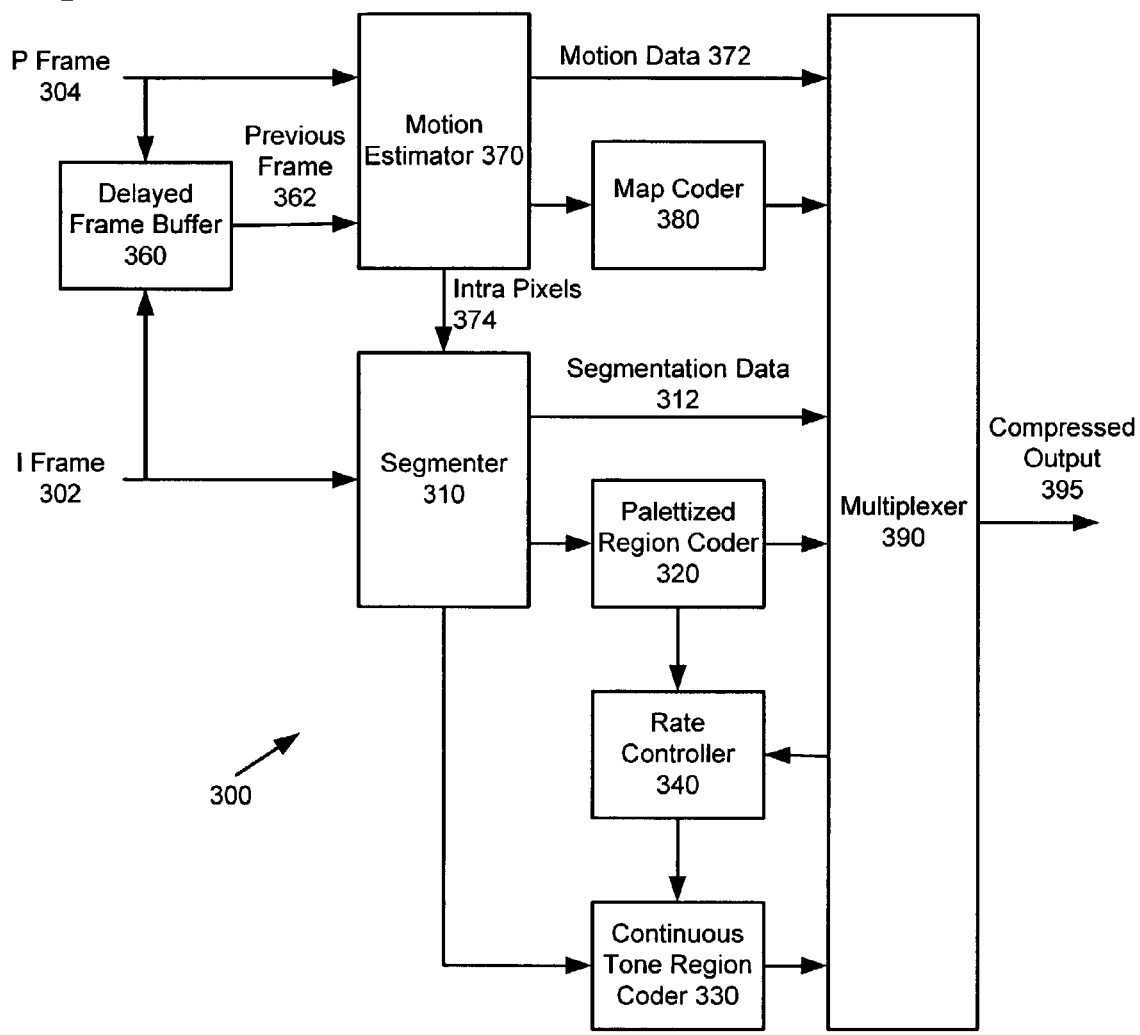
FIGS. 3 and 4 are block diagrams of a screen capture encoder and decoder implemented in the screen capture tool of FIG. 2.
Figure 4:
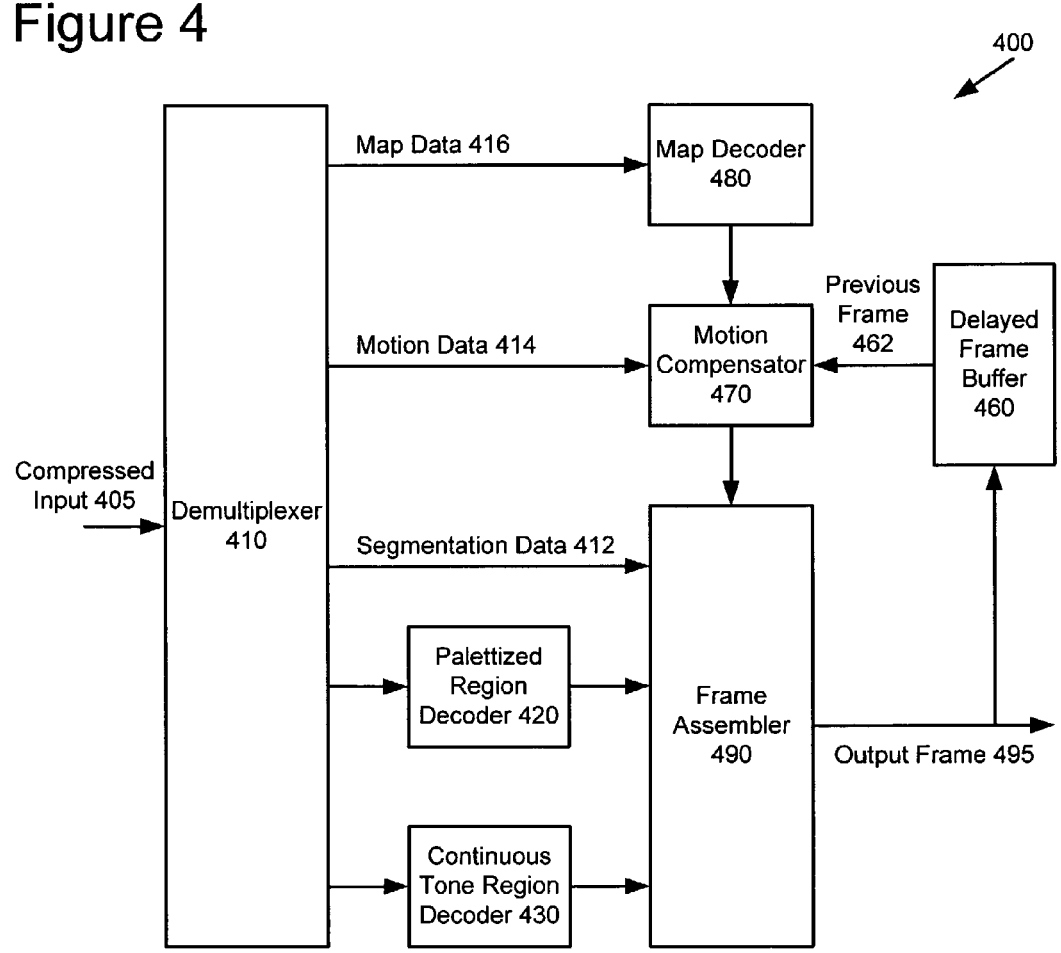

FIGS. 3 and 4 are block diagrams of an exemplary screen capture encoder (300) and an exemplary screen capture decoder (400), respectively. In various respects, the encoder (300) and decoder (400) are customized to compress/decompress frames of pixel information for screen areas captured from the screen of a visual display unit. Alternatively, the encoder (300) and decoder (400) compress/decompress frames of pixel information for other types of content.

In a common screen capture scenario, a screen capture module (not shown) captures screen areas that the encoder (300) compresses as a series of frames. The screen capture module can be a standalone software application, a feature of a multimedia production or encoding package, a plug-in, or some other form of product. The captured screen areas can show an entire screen (for example, an entire desktop environment), a selected window, or an arbitrary region of the desktop environment. In general, a screen area depicts some or all of the screen content presented or prepared for presentation in a desktop environment or other graphical user interface for a computer system. To capture a screen area, the screen capture module uses a Bit Block Transfer or other screen capture technique, such as one described in U.S. patent application Ser. No. 10/160,697, filed May 30, 2002, entitled "Reducing Information Transfer In Screen Capture Series," hereby incorporated by reference.

The screen capture module typically lets a user set high-level options for a capture session (e.g., media sources and types, quality, resultant bit rate, and output stream or file location). The screen capture module can also present low-level options to the user, such as capture frame rate, output resolution, time distortion (e.g., slow motion). The capture frame rate for a series of screen areas may be fixed for the duration of the series or vary during screen capture for all or part of a screen area so as to increase temporal resolution when possible and decrease temporal resolution (even skipping frames) if necessary.

The relationships shown in FIGS. 3 and 4 indicate the main flow of information in the encoder and decoder; other relationships are not shown for the sake of simplicity. Depending on implementation and the type of compression/decompression desired, modules of the encoder or decoder can be added, omitted, split into multiple modules, combined with other modules, and/or replaced with like modules. In alternative embodiments (some of which are described below), an encoder or decoder can include different modules and/or other configurations of modules for continuous tone/palettized content segmentation.

Exemplary Screen Capture Encoder

The exemplary screen capture encoder (300) includes a segmenter (310), a palettized region coder (320), a continuous tone region coder (330), a rate controller (340), a delayed frame buffer (360), a motion estimator (370), a map coder (380), and a multiplexer (390). With these modules, the encoder (300) performs live or off-line compression of a series of frames. The encoder (300) multiplexes the output of the various modules to produce a bitstream of compressed output (395) in system memory, a file in storage, one or more streams over a network, or another location. The input and output formats of the encoder (300) vary by implementation. For additional detail about particular modules of the encoder (300) in certain implementations, see the applications referenced in the Related Application Data section.

The encoder (300) compresses the first frame of the series as an I Frame (302) (alternatively called a key frame, intra frame, or intra-coded frame), using only information within the I Frame (302) to compress the I Frame (302). The encoder (300) compresses each of one or more subsequent frames of the series as a P Frame (304) (alternatively called a predicted frame, inter frame, or inter-coded frame). Each P Frame (304) may be compressed with reference to one or more other frames (for example, the previous frame). Also, the encoder (300) can compress a subsequent frame as an I Frame (304) periodically, as necessary (e.g., when the frame changes dramatically relative to the previous frame), or on some other basis.

For compression of an I Frame (302), the encoder (300) provides the I Frame (302) to the segmenter (310). The segmenter (310) partitions the I Frame (304) into continuous tone regions and palettized regions. The continuous tone regions are characterized by a large color space (e.g., 24 bits per pixel) and gradually varying color values from pixel to pixel. In a captured screen area, the continuous tone regions might include a background wallpaper photograph or an image in a web browser. On the other hand, the palettized regions are characterized by a smaller color space (e.g., 8 bits per pixel, often indices to a color palette), long runs of identical color values, and sharply contrasting changes in color value when changes occur. In a captured screen area, the palettized regions might include text on a solid background, icons, buttons, toolbars, menus, or other user interface features. The segmenter (310) may also segment graphical text from continuous tone regions, so that the text can be compressed losslessly, even if the encoder (310) introduces distortion in the continuous tone regions to reduce bit rate. Alternatively, the segmenter (310) uses other segmentation techniques and/or segments regions according to different or additional criteria.

The segmenter (310) transmits segmentation data (312) to the multiplexer (390) describing the segmented regions. The segmentation data (312) can be compressed in a lossy or lossless manner. The segmenter (310) also transmits pixel information for the regions of the I Frame (302) to the palettized region coder (320) and the continuous tone region coder (330).

The palettized region coder (320) compresses the palettized regions using techniques adapted to the characteristics of palettized screen content. Lossy compression techniques introduce distortion that can obliterate fine detail such as text and button graphics in palettized regions. Accordingly, the palettized region coder (320) uses a lossless compression technique such as run length coding, arithmetic coding, dictionary coding, variable-to-variable length coding, Huffman coding, LZ coding, a combination of the above, or some other entropy coding technique. In one alternative implementation, the palettized region coder uses a palettized compression technique described in U.S. patent application Ser. No. 09/577,544, filed May 24, 2000, which is hereby incorporated by reference herein. Alternatively, the palettized region coder (320) uses compression techniques different than or in addition to the foregoing techniques to compress the palettized regions.

The palettized region coder (320) transmits data such as the pixel information and side information for the palettized regions to the multiplexer (390).

The continuous tone region coder (330) compresses the continuous tone regions using techniques adapted to the characteristics of continuous tone screen content. The continuous tone region coder (330) uses a combination of lossy and lossless compression techniques. Ideally, the continuous tone region coder (330) uses lossless compression or introduces imperceptible distortion, but the bit rate for such compressed output is often too high. In many scenarios, output must be compressed to a lower bit rate, or available bits are better spent on higher frame rate to smooth changes in palettized regions from frame to frame. To reduce bit rate for the continuous tone regions at some cost to quality, the continuous tone region coder (330) uses some form of quantization (e.g., scalar or vector, uniform or non-uniform, and static or adaptive). Quantization introduces irreversible loss of information, but can also allow the encoder (300) to regulate quality and bitrate. The quantization potentially follows a frequency transformation or decomposition (e.g., DCT, FFT, MLT, wavelets, subband coding) of the pixel information for the continuous tone regions, and can incorporate perceptual modeling. After the quantization, the continuous tone region coder (330) uses some form of lossless compression such as run length coding, arithmetic coding, dictionary coding, variable-to-variable length coding, Huffman coding, LZ coding, a combination of the above, or some other entropy coding technique. Alternatively, the continuous tone region coder (330) uses compression techniques different than or in addition to the foregoing techniques to compress the continuous tone regions.

The continuous tone region coder (330) transmits data such as pixel information and side information for the continuous tone regions to the multiplexer (390).

The rate controller (340) regulates the overall bit rate of the compressed output (395) by controlling the quantization of the continuous tone regions in the continuous tone region coder (330). The rate controller (340) receives information from other modules of the encoder (300), including the bit rate of the palettized regions for the frame and the current fullness of a virtual buffer in the multiplexer (390). Using this information and other information for the encoding session (e.g., average bits per pixel for I Frame or P Frame, quality criteria), the rate controller (340) budgets bits for the continuous tone regions and transmits the bit budget to the continuous tone region coder (330). The rate controller (340) seeks to satisfy numerous bit rate and quality constraints, both instantaneous and long term. For example, the rate controller (340) seeks to avoid virtual buffer underflow and overflow, maintain relatively constant bit rate over time, allocate bits for continuous tone regions fairly from frame to frame, and maintain at least a minimum quality for continuous tone regions. The continuous tone region coder (330) tests one or more quantization levels, and the results are evaluated in terms of bit rate and quality. When the quality of the continuous tone regions falls below a certain point, the encoder (300) may drop a frame or the continuous tone regions rather than send poor quality information. Alternatively, the rate controller (340) uses techniques different than or in addition to the foregoing techniques to control the rate and/or quality of some or all types of pixel information.

The multiplexer (390) multiplexes the information received from the various modules of the encoder (300), producing output (395) in a format that the decoder (400) recognizes. The multiplexer (390) may also receive other information not shown in FIG. 3, such as frame header information, from the various modules of the encoder (300) or elsewhere. The multiplexer (390) includes a virtual buffer, which stores a pre-determined duration of compressed information (e.g., 5 seconds) in order to smooth over short-term fluctuations in bit rate due to complexity changes or other characteristics of the content or encoder (300). The virtual buffer outputs data at a constant or relatively constant bitrate (e.g., to a file or stream). The current fullness of the virtual buffer, the rate of change of fullness of the buffer, and other characteristics of the buffer can be used by the rate controller (340).

For compression of a P Frame (304), the encoder (300) provides the P Frame (304) to the motion estimator (370). The motion estimator (370) compares the P Frame (304) to the previous frame (362) buffered in the delayed frame buffer (360), which can be an I Frame or P Frame. In a pixel-by-pixel map for the P Frame (304), the motion estimator (370) indicates which of the pixels of the P Frame (304) are identical in value to the pixels at the same locations in the previous frame (362). For regions of non-identical pixels in the P Frame (304), the motion estimator (370) computes motion information (372) (e.g., motion vector(s)) describing motion relative to the previous frame (362). To compute the motion information (372) the motion estimator searches in the previous frame (362) for regions that match the regions of non-identical pixels in the P frame (304). One match criterion is the number of exactly matching pixels. In the map for the P Frame (304), the motion estimator (370) indicates which of the pixels of the P Frame (304) should be reconstructed by motion compensation using the motion information (372). The remaining pixels of the P Frame (304) are intra pixels—neither identical in value to pixels at the same locations in the previous frame (362) nor predicted by the motion estimation. Alternatively, the motion estimator (370) uses techniques different than or in addition to the foregoing techniques to predict values for P Frames from reference frames and indicate the results.

The motion estimator (370) transmits the pixel-by-pixel map to the map coder (380). The motion estimator (370) also transmits pixel information for the intra pixels (374) of the P Frame (304) to the segmenter (310).

The map coder (380) compresses the pixel-by-pixel map for the P Frame (304) using a lossless compression technique such as run length coding, arithmetic coding, dictionary coding, variable-to-variable length coding, Huffman coding, LZ coding, a combination of the above, or some other entropy coding technique. Alternatively, the map coder (380) uses compression techniques different than or in addition to the foregoing techniques to compress the pixel-by-pixel map. For example, in an alternative embodiment, the map coder also compresses the map using lossy compression. The map coder (380) transmits data such as the compressed map to the multiplexer (390).

The segmenter (310), the palettized region coder (320), the continuous tone region coder (330), and the rate controller (340) perform the operations described above to compress the intra pixels (374) of the P Frame (304).

Although the exemplary encoder (300) includes a motion estimator (370) and rate controller (340), in alternative encoder embodiments incorporating continuous-tone/palettized content segmentation as described herein, these elements among others can be omitted.

Exemplary Screen Capture Decoder

The exemplary screen capture decoder (400) includes a demultiplexer (410), a palettized region decoder (420), a continuous tone region decoder (430), a frame assembler (440), a delayed frame buffer (460), a motion compensator (470), and a map decoder (480). With these modules, the decoder decompresses a series of frames for playback. For additional detail about particular modules of the decoder (400) in certain implementations, see the applications referenced in the Related Application Data section.

The demultiplexer (410) demultiplexes the compressed input (405), producing outputs for the various modules of the decoder (400).

For decompression of an I Frame, the palettized region decoder (420) decompresses the palettized regions of the frame, for example, reversing the compression performed in the palettized region coder (320). The palettized region decoder (420) transmits the decompressed information for the palettized regions to the frame assembler (490).

The continuous tone region decoder (430) decompresses the continuous tone regions of the frame, producing reconstructed versions. For example, the continuous tone region decoder (430) reverses lossless compression performed in the continuous tone region coder (330) and then reverses any quantization and frequency transform/decomposition operations performed in the continuous tone region coder (330), typically performing the inverse of the operation. The continuous tone region decoder (420) transmits the decompressed information for the continuous tone regions to the frame assembler (490).

The frame assembler (490) receives the segmentation data (412) from the demultiplexer (410) as well as the decompressed information from the palettized region decoder (420) and the continuous tone region decoder (430). Using this information, the frame assembler (490) constructs the I Frame. For example, the frame assembler (490) uses the segmentation data (412) to determine where to place the decompressed pixel information for the palettized regions and continuous tone regions in the I Frame. The frame assembler (490) then outputs a frame (495) for playback. The delayed frame buffer (460) can store the output frame (495) for use as a reference frame for the following frame.

For decompression of a P Frame, the map decoder (480) decompresses the map data (416), for example, reversing the compression performed in the map coder (380). The map decoder (480) transmits data such as the decompressed map to the motion compensator (470).

The motion compensator (470) receives the motion data (414) from the demultiplexer (410) as well as the decompressed map from the map decoder (480). Using the decompressed map and the previous frame (462), the motion compensator (470) constructs the regions of pixels of the P Frame that are identical in value to the pixels at the same locations in the previous frame (462). Using the decompressed map, the motion data (414), and the previous frame (462), the motion compensator (470) constructs the motion-compensated regions of pixels of the P Frame. Alternatively, the motion compensator (470) uses techniques different than or in addition to the foregoing techniques to compensate for prediction in the encoder. The motion compensator (470) transmits the constructed regions of the P Frame to the frame assembler (490).

The palettized region decoder (420) and continuous tone region decoder (430) decompress pixel information for the intra pixels of the P Frame, using the techniques described above.

The frame assembler (490) receives the decompressed pixel information for the intra pixels, the segmentation data (412) from the demultiplexer (410), and the constructed regions from the motion compensator (470). Using this information, the frame assembler (490) constructs the P Frame. For example, the frame assembler (490) uses the segmentation data (412) to determine how to place the decompressed pixel information for the palettized regions and continuous tone regions of the intra pixels of the P Frame around the constructed regions from the motion compensator (470). The frame assembler (490) then outputs a frame (495) for playback, which can be stored in the delayed frame buffer (460) for use as a reference frame.

Although the exemplary decoder (400) includes a map decoder (480), motion compensator (470) and delayed frame buffer (460), alternative decoder embodiments incorporating continuous-tone/palettized content segmentation as described herein need not include all these depicted elements of the exemplary decoder.

Figure 5:
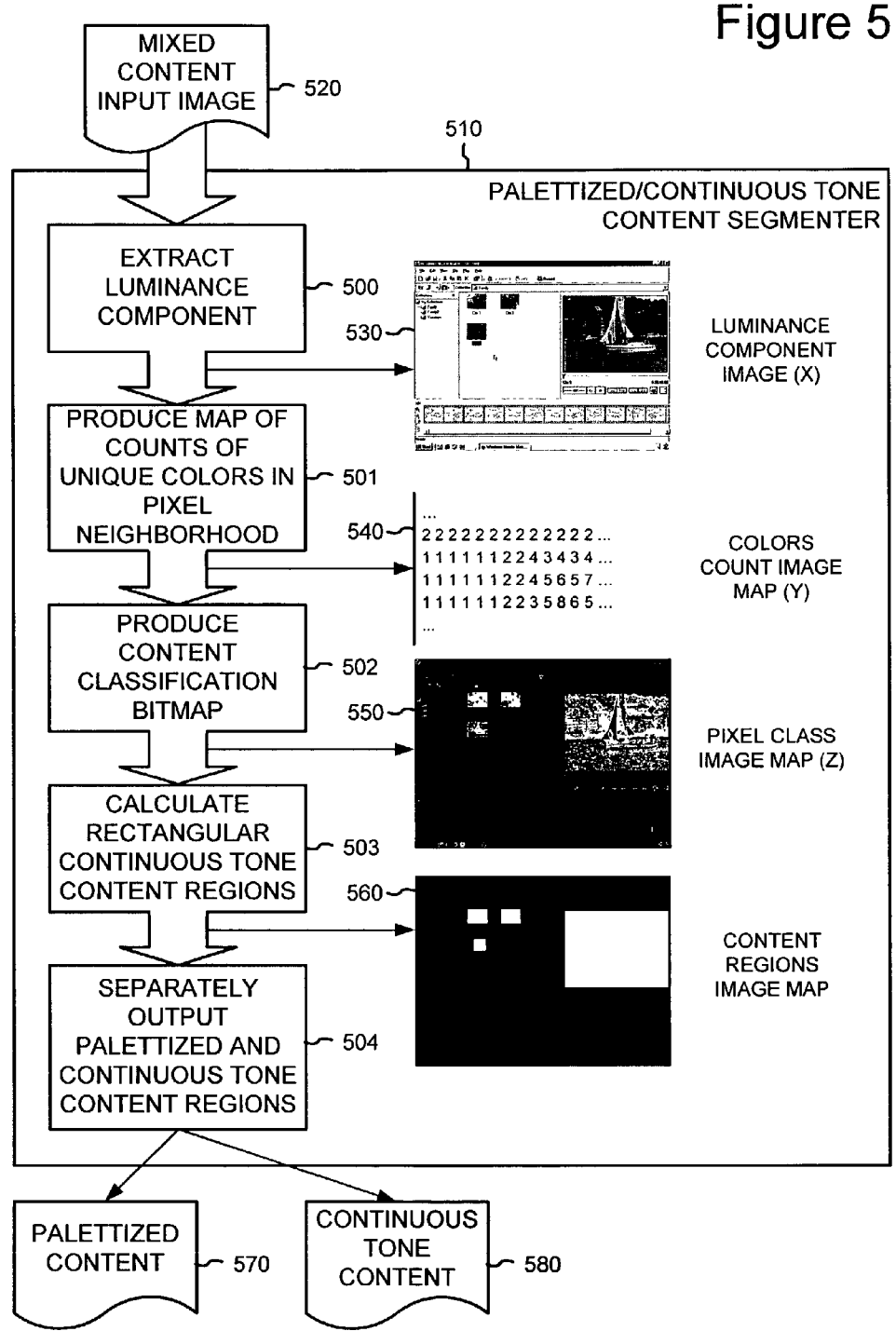
FIG. 5 is a data flow diagram depicting a continuous tone/palettized content segmentation operation for compression of a mixed-content image with palettized and continuous tone content.

Mixed-Content Video/Image Codec with Continuous-Tone/Palettized Content Segmentation With reference now to FIG. 5, a continuous-tone/palettized content segmenter (510) implements continuous-tone/palettized content segmentation techniques to segment a mixed-content image into palettized content regions (560) and continuous-tone content regions (570). The continuous-tone/palettized segmenter (510) can be incorporated in the segmenter (310) (FIG. 3) of the screen capture encoder (300). As explained more fully below, the continuous-tone/palettized content segmenter (510) utilizes a characteristic of palettized content that a pixel's color value generally is the same as its neighboring pixels, whereas the neighboring colors for pixels of continuous tone content typically are different.

FIG. 5 illustrates a data flow in the continuous-tone/palettized content segmentation process within the continuous-tone/palettized content segmenter (510). The various actions within the continuous-tone/palettized content segmentation process (600) are detailed more particularly below with reference to the flow charts in FIGS. 6–8.

Initially, a mixed-content image (520) is input to the segmenter (510). Optionally, to speed up performance, the segmenter (510) can extract and use the luminance component of image's pixels (at operation 500) as the pixels' colors in the segmentation process (600), rather than the full color value (e.g., RGB, YIQ or other value, including chrominance information). The luminance component alone typically provides sufficient basis to determine if a pixel's color is identical to or differs from that of its neighbors. The luminance extraction operation (500) produces a luminance component image, X (530)—essentially a gray-scale version of the input image. In some implementations, the luminance extraction operation (500) can be omitted, and the fill color image used.

In a counting operation (501), the segmenter (510) processes the luminance component image (530) (or optionally the full color input image (520)), counting the number of unique colors within a neighborhood of each pixel in the image. The segmenter (510) creates a neighborhood colors count map, Y (540) corresponding to the input image, and stores the unique neighborhood colors count of each image pixel at corresponding locations in the color count map. In one implementation, the neighborhood of a pixel is a rectangle of N×M pixels size (e.g., where N=M=3 pixels) centered on the respective pixel. With this neighborhood shape and size, the count stored in the count map (540) for each pixel is a number between 1 (where all pixels in the neighborhood have the same value) and 9 (where all pixels in the neighborhood are different values). Alternatively, the neighborhood can be defined by larger, smaller, off-center, or also non-rectangular shapes. For example, the neighborhood alternatively can be a t-shaped neighborhood of five pixels size encompassing the respective pixel and its immediately adjacent pixels (above, below and to either side).

In a classification operation (502), the segmenter (510) next classifies the pixels as continuous tone or palettized content based on their unique colors count in the neighborhood colors count map (540). The segmenter (510) compares the pixels' unique colors counts in the neighborhood count map (540) to a threshold. Pixels with large neighborhood colors count (e.g., over the threshold) are classified as continuous tone, whereas low neighborhood count pixels are classified as palettized content. In one implementation using the N×M rectangle neighborhood with size N=M=3, a threshold equal to 4 can be used. In this implementation example, pixels with counts greater than or equal to 4 are classified as continuous tone, and those with counts less than 4 are classified as palettized. More generally, the threshold can be chosen as a number between 1 and the neighborhood size in pixels. The segmenter (510) creates a pixel classification map, Z (550) corresponding to the input image to store the continuous-tone or palettized content classification of the pixels. The pixel classification map (550) can be a bitmap, with a single bit per input image pixel to indicate its classification as continuous-tone or palettized content.

In a region forming operation (503), the segmenter (510) then identifies larger-scale features in which to segment the input image into continuous-tone and palettized content regions, that are more appropriately sized for encoding by the continuous-tone region encoder (330) and palettized region encoder (320). Isolated continuous-tone pixels, for example, cannot be effectively compressed by the continuous-tone region encoder (330). For continuous tone image compression in the continuous-tone region encoder (330), the segmenter (510) desirably segments the continuous-tone portions of the input image into rectangular regions that are multiples of the transform block size used in such continuous tone image compression (which may be an 8×8 pixel block for a discrete cosine transform used in some typical continuous tone image compression encoders, for example). In one implementation, the segmenter (510) identifies rectangular regions of continuous tone content by scanning the image to find a starting block-sized, continuous-tone content region meeting a certain continuous-tone pixel density criteria, then iteratively expanding this initial size block to fully encompass a contiguous rectangular region of continuous-tone content. Alternatively, other ways of aggregating continuous-tone and/or palettized pixels, or identifying areas of predominantly one or the other type content can be used. The segmenter (510) can store the results of the region forming operation as a content regions map (560), which similar to the pixel classification map (550) can be a bitmap which represents the classification of pixels as in a continuous-tone content region or palettized region using a single bit per pixel. Alternatively, the regions can be represented as a list of continuous tone region coordinates or other data structure.

In output operation (504), the segmenter (510) separately outputs palettized content (570) and continuous tone content (580) from the input image (520) as identified in the region forming operation (503) to the palettized region coder (320) and continuous tone region coder (330), respectively. In one implementation, the segmenter (510) replaces the continuous tone regions of the input image by overwriting with a single color value (e.g., an unused color value out of the color palette of the palettized content), and outputs the resulting image to the palettized region coder (320) for compression. The segmenter (510) outputs the content of the continuous tone regions and the coordinates of those regions to the continuous tone region coder (330) for encoding in the compressed output (395). At the decoder, the image encoded by the palettized region coder (320) is decoded along with the continuous tone regions and their coordinates. The decoded continuous tone regions are then superimposed at their decoded coordinates on the decoded image. Alternatively, the segmenter (510) can output separate regions of palettized content and their coordinates for encoding by the palettized region coder (320) into the compressed output (395). At the decoder, the separate palettized and continuous tone regions are decoded and reassembled to reconstruct the image.

Figure 6:
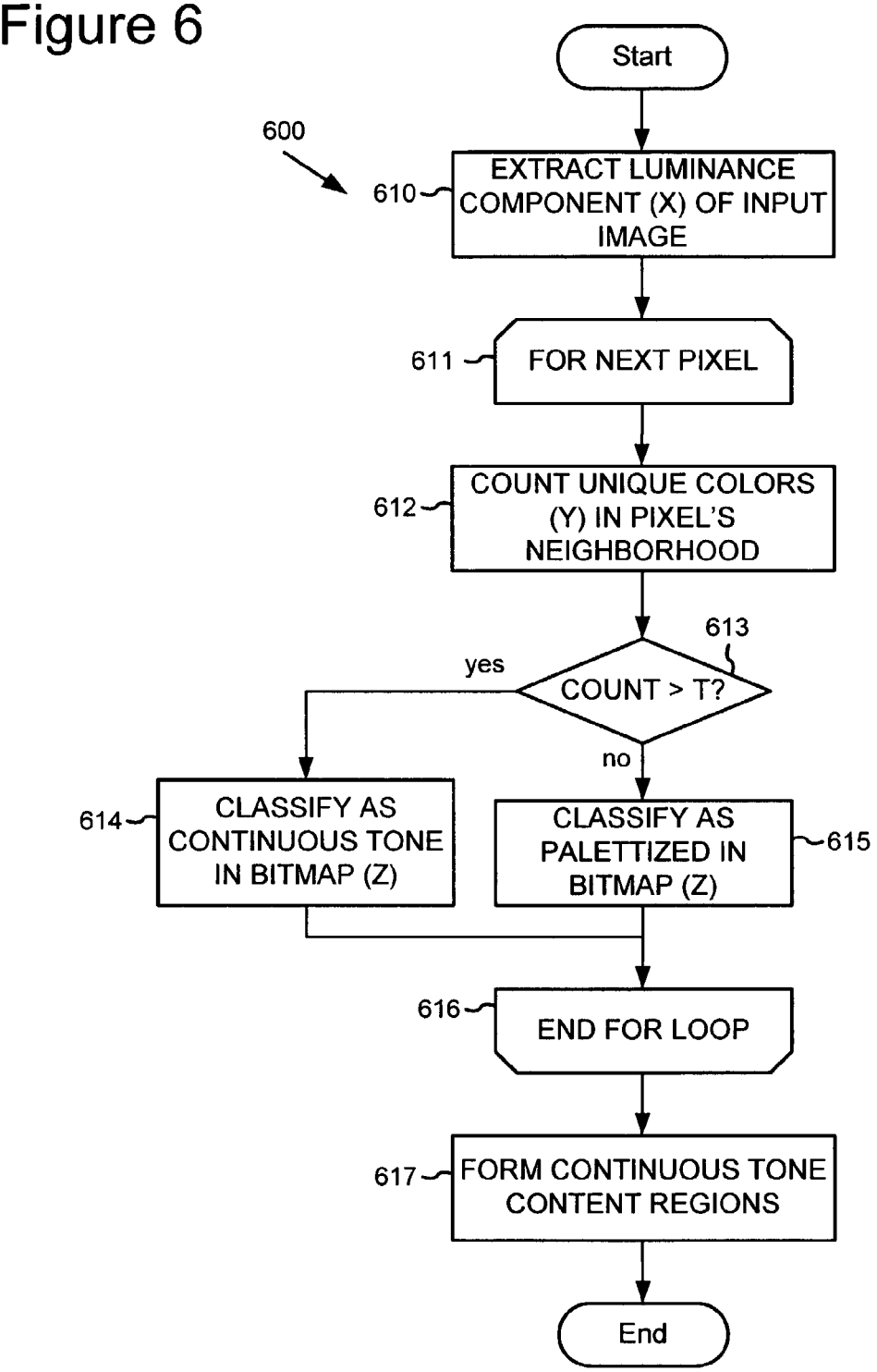
FIG. 6 is a flow chart of a process for classifying palettized and continuous tone content pixels within the segmentation operation of FIG. 5.

As detailed more particularly in FIG. 6, the segmenter (510) segments the input image (520) using a palettized/continuous tone content segmentation process (600). The process (600) begins with extracting a luminance component of the input image pixels in a first action (610), so as to speed up subsequent processing steps. This produces the luminance component image (530). For images with pixels represented in a color model with an explicit luminance component (e.g., YIQ), the extracting action (610) can be performed by directly copying the luminance component of the pixels' color values. Otherwise (e.g., for RGB color values), the extracting action (610) may involve converting the pixel color values. The extracting action (610) optionally can be omitted in some implementations of the segmentation process (600), and the full color values of the input image pixels instead processed in subsequent actions.

The segmentation process (600) next loops through a sequence of actions (611–616) on a pixel-by-pixel basis. In action (612), the segmentation process (600) counts the number of unique colors within a neighborhood (e.g., a 3×3 pixel block or other neighborhood) about the pixel being processed in a current iteration of the loop (611–616). The segmentation process (600) then compares the pixel's unique neighborhood colors count to a threshold value (e.g., 4) in action (613). Based on this comparison, the segmentation process (600) classifies the pixel as continuous tone or palettized content in actions (614–615). The color counting action (612) and classifying actions (613–615) can be performed as a single pass or in separate processing passes over the image's pixels. The loops actions (611–616) produce a content classification at an individual pixel basis, which can be represented as a pixel classification bitmap (550) described above.

Because image compression techniques generally are not applied to individual pixels, the segmentation process (600) forms larger regions of the image with pixels that are predominantly a same content classification in action (617). One technique for identifying such larger regions is described below with reference to FIGS. 7–10.

Figure 7:
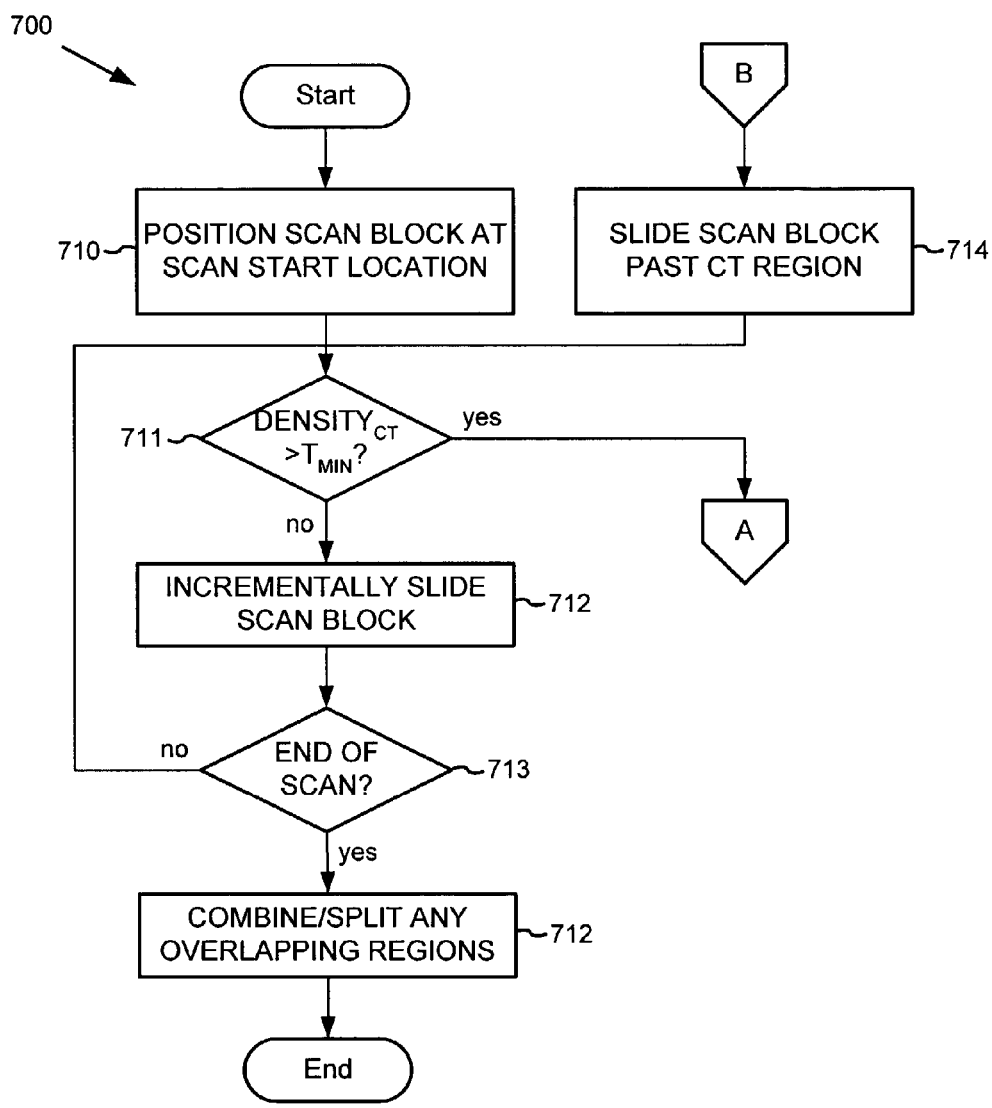
FIGS. 7 and 8 are a flow chart of a process for identifying palettized and continuous tone content regions within the segmentation operation of FIG. 5.

With reference now to FIG. 7, the segmenter (510) identifies regions of continuous tone and palettized content in which to segment the input image in a content regions identifying process (700). The illustrated content regions identifying process (700) searches the image for rectangular regions composed predominantly of pixels classified as being continuous tone content.

In action (710), the process (700) starts by positioning a scan block at a scan start location in the image. In one implementation, the scan block is a 32×32 pixel-sized sized block, which is initially positioned at one corner of the image (e.g., top left corner). The process (700) then repeats a loop of actions (711–713), in which the continuous-tone pixel density of the scan block is examined as the scan block is moved incrementally across the image.

Figure 10:
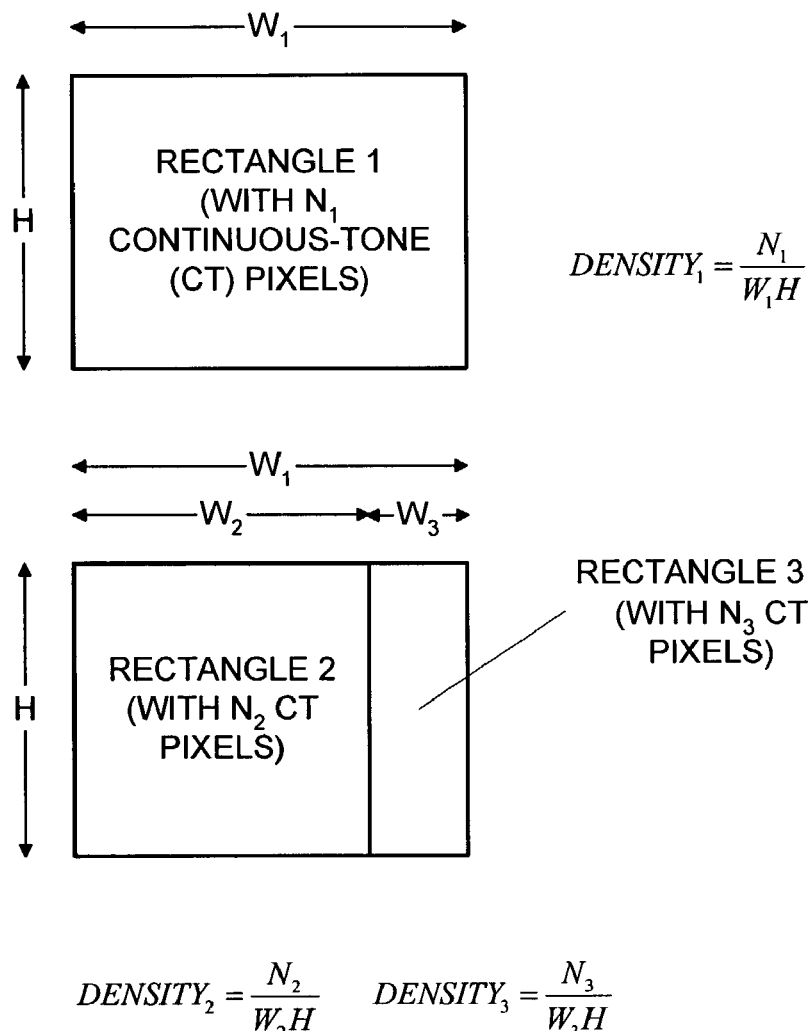
FIG. 10 is a diagram illustrating an example of selective adjustment of a rectangular continuous tone region using the procedure shown in FIG. 9.

More specifically in action (711), the process (700) calculates the continuous tone pixel density (Density$_{CT}$) of the scan block at its current location in the image. As shown in FIG. 10, the density of the scan block is calculated as the number of pixels in the block that are classified as being continuous tone, divided by the area (i.e., height multiplied by width in pixels) of the scan block. The process (700) compares the block's continuous tone pixel density to a threshold. If the continuous tone pixel density of the current scan block location is sufficiently high (e.g., greater than a minimum density threshold (T$_{MIN}$)), the process (700) proceeds to identify the extent of the predominantly continuous tone region that encompasses the current scan block location in a sub-process (800) shown in FIG. 8 and described more fully below. Otherwise, the process (700) continues to scan the image in action (712) by incrementally sliding the scan block across the image to a next location. In one implementation, the process (700) moves the scan block across the image in 2-pixel movement increments, traversing the image from side-to-side and repeating traverses from end-to-end. Alternatively, other scan increments and patterns can be used. As indicated at action (713), the process (700) repeats the pixel density comparison action (711) and incremental sliding (712) until the image has been completely scanned for continuous tone regions.

Figure 8:
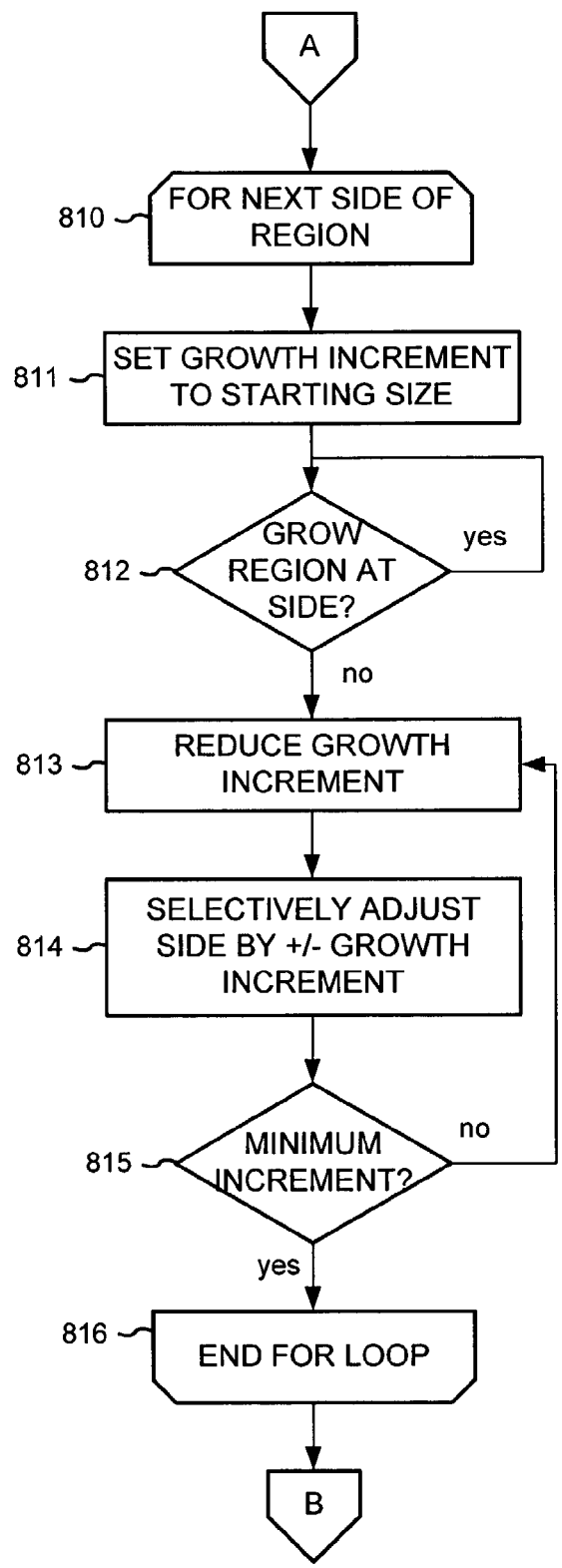

Turning now to FIG. 8, when a scan block location having sufficiently high continuous tone pixel density is found at action (711), a sub-process (800) is performed to identify the extent of the continuous tone content region. This sub-process (800) iteratively grows or shrinks the sides of the continuous tone content region starting from the initial scan block size region. The sub-process (800) repeats a sequence of actions (810–816) to adjust the sides of the region.

At action (811), the sub-process (800) sets a growth increment to a starting size (e.g., 128 pixels in one implementation). The sub-process (800) then tests whether to adjust the current side of the region outward by the growth increment in action (812). The sub-process (800) chooses whether or not the adjustment of the side would result in a better continuous tone content region based on the continuous tone content pixel densities and criteria represented in the pseudo-code procedure listing shown in FIG. 9 and described below. If growing the side is considered to result in a better continuous tone content region by this criteria, the sub-process (800) expands the region at the current side by the growth increment. The sub-process (800) can repeat growing the region at the current side zero or more times until the test results in a determination not to grow the region at the current side. For example, the initial 32×32 pixel scan block could be grown to 160×32 pixels, 288×32 pixels, etc. or remain at 32×32 pixels, whichever results in a better continuous-tone region.

In actions (813–815), the sub-process (800) selectively adjusts the side of the region by successively smaller increments, until a minimum increment is reached. The sub-process (800) reduces the growth increment size in action (813), such as by halving the growth increment. For each repetition of the actions (813–815), the growth increment is successively reduced. For example, the increment can be reduced by half for each repetition, so that in successive repetitions the growth increment by which the side of the region is adjusted reduces from the initial 128 pixels, to 64, 32, etc. The sub-process (800) then tests whether to adjust the side of the region by increasing or decreasing the side by the current growth increment in action (814), again applying the criteria represented in the pseudo-code procedure listing shown in FIG. 9 and described below to choose whether the increase/decrease by the growth increment would result in a better continuous tone content region. As indicated in action (815), the sub-process (800) continues to reduce the growth increment and selectively adjust the current side of the region until reaching a minimum increment size. With the successively smaller adjustments of the region's side, the sub-process (800) converges to a size for the continuous tone region considered "best" according to the criteria of the procedure in FIG. 9.

Figure 11:
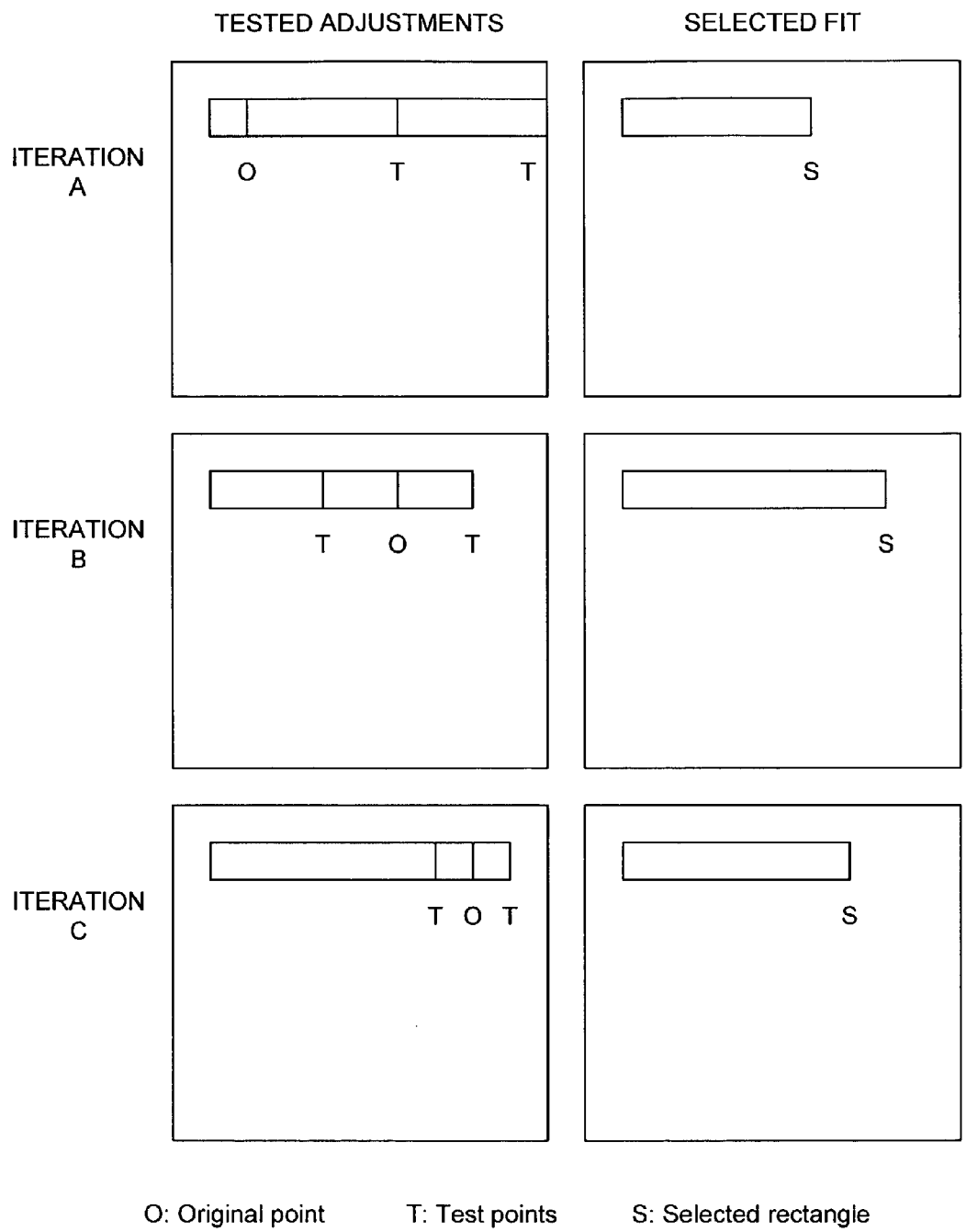
FIG. 11 is a grid showing a hierarchy of search rectangles for an example continuous region of an image, which illustrates tested adjustment increments and selected fit rectangles in successive iterations of the procedure shown in FIG. 9.

FIG. 11 illustrates a search for a rectangle best fitting (by the criteria of the procedure in FIG. 9) a region of continuous tone content in an example image using the sub-process (800). Iteration A in the example shown in FIG. 11 initially grows the starting rectangle (labeled 'O') by the initial size growth increment (to possible test rectangles labeled 'T'), and selects the best fit (labeled 'S') from among the original and test points as per action (812) of the sub-process (800). Iterations B and C in the example then adjust the rectangle (labeled 'O') selected in the preceding iteration by decreasing size increments (to test points labeled 'T'), again selecting a best fit rectangle (labeled 'S') as per actions (813–815).

The iterative adjustment by decreasing size adjustment increments as shown in actions (813–815) has the advantage of more quickly converging on a "best" fit (according to the criteria) to the continuous tone region of the image. However, in some alternative implementations of the sub-process (800), the sub-process alternatively can use a small constant-size adjustment increment, such as a one or two pixel adjustment increment. This alternative sub-process arrives at the best fit by simply growing the region by this small constant-size adjustment increment at action (812), and omits adjusting the side by decreasing increments in actions (813–815). This alternative sub-process typically searches a larger number of possible search rectangles to arrive at a best fit for the continuous tone region (i.e., an order (N) search). By comparison, the sub-process (800) as illustrated with decreasing adjustment increments in actions (813–815) can result in an order of log(N) search.

As indicated in action (816), the sub-process (800) then repeats the actions (810–816) for subsequent sides of the region. In some implementations, the sub-process (800) repeats the actions (810–816) a second time to ensure convergence.

With reference again to FIG. 7, the process (700) after identifying continuous tone regions in the image also combines or splits any overlapping regions to form non-overlapping continuous tone regions in action (716). This avoids duplicative encoding of the continuous tone content in overlapping continuous tone segments.

Figure 12:
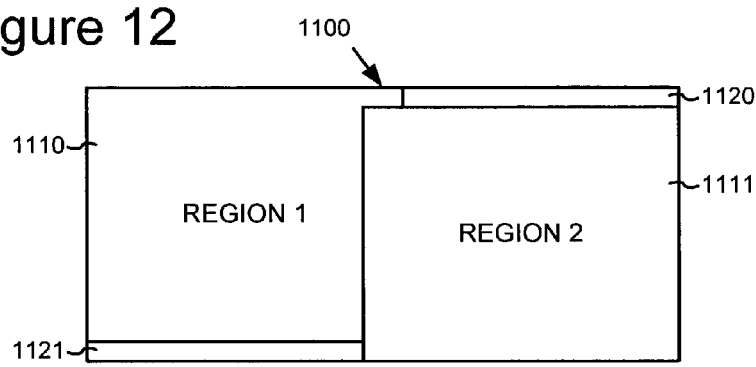
FIG. 12 is a diagram illustrating an example of combining overlapping continuous tone regions in the procedure shown in FIG. 7.

FIG. 12 illustrates an example in which overlapping regions (1210–1211) can be combined into a larger single continuous tone content region (1200) by the addition of one or more image portions (1220–1221) outside the continuous tone content regions. The process (700) performs such combination of the overlapping regions when the smaller dimension (height or width) of the added image portions is sufficiently small (e.g., less than a minimum threshold), so as to incorporate only a minimal amount of non-continuous tone content into the combined continuous tone content region.

Figure 13:
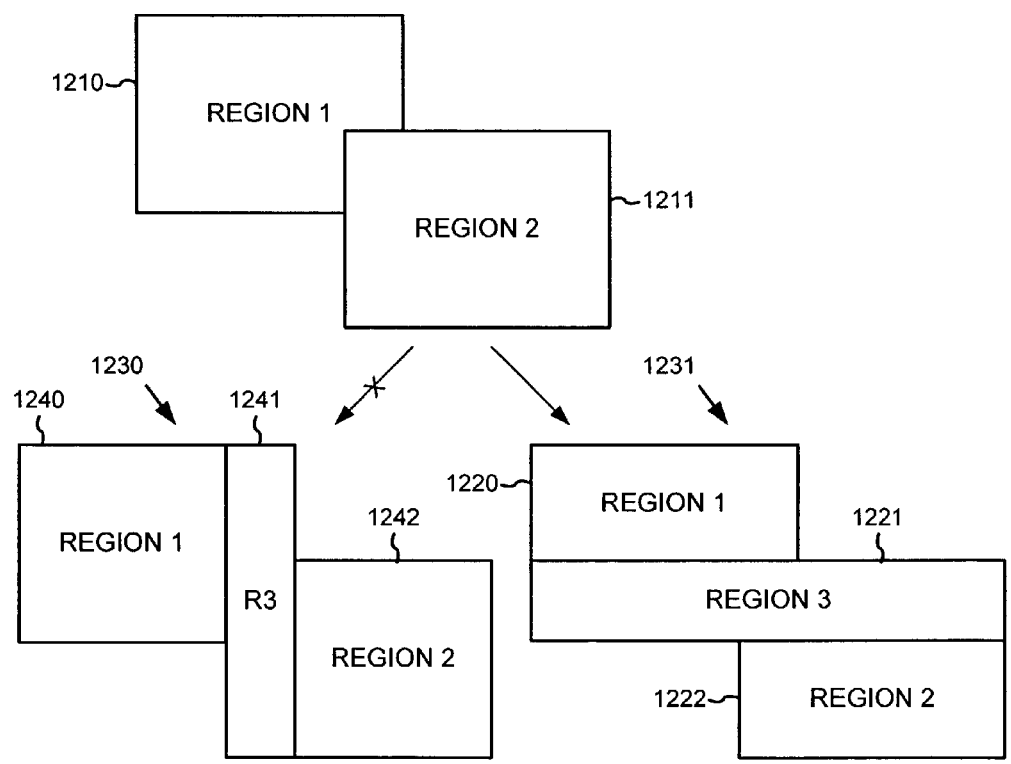
FIG. 13 is a diagram illustrating an example of splitting overlapping continuous tone regions in the procedure shown in FIG. 7.

On the other hand, FIG. 13 illustrates an example in which two overlapping regions (1310–1311) are split into three non-overlapping regions (1320–1322). The process (700) performs such splitting rather than the combination into a single region when the added image portions required to form a combined region are too large. As shown in FIG. 13, there are generally two configurations (1330–1331) of non-overlapping regions in which the two overlapping continuous tone content regions can be split. The process (700) chooses the configuration that results in non-overlapping regions having the greater minimum dimension. In the illustrated example, the minimum dimension (height of region (1321)) in the configuration (1331) is greater than the minimum dimension (width of region (1341)). So, the process (700) splits the overlapping regions (1320–1322) into the regions (1320–1322) in configuration (1331).

ALTERNATIVES

Having described and illustrated the principles of our invention with reference to illustrated embodiments, it will be recognized that the illustrated embodiments can be modified in arrangement and detail without departing from such principles. It should be understood that the programs, processes, or methods described herein need not be related or limited to any particular type of computer apparatus. Various types of general purpose or specialized computer apparatus may be used with, or perform operations in accordance with, the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A computer-implemented method of segmenting continuous tone and palettized content in an input image, the method comprising:
    on a per pixel basis, counting a number of unique colors within a neighborhood of the respective pixel in the image;
    classifying pixels having a high number of unique colors within their neighborhood as continuous tone;

calculating a density of continuous tone pixels for a plurality of regions in the image;

identifying regions with a high density of continuous tone pixels as continuous tone regions; and segmenting the image into the continuous tone regions and non-continuous tone regions.

2. The method of claim 1 further comprising:

compressing the segmented continuous tone regions using an encoder suited to continuous tone image compression; and compressing the non-continuous tone regions using an encoder suited to palettized image compression.

3. The method of claim 2 further comprising:

decompressing the compressed continuous tone regions;

separately decompressing the compressed non-continuous tone regions; and reassembling the decompressed regions to reconstruct the image.

4. The method of claim 1 wherein said counting comprises:

extracting a luminance component of the pixels; and differentiating colors within a pixel's neighborhood based on the extracted luminance components of pixels in the neighborhood.

5. The method of claim 1 wherein said identifying regions further comprises:

scanning the image to locate an initial size block having a high density of continuous tone pixels; and iteratively adjusting sides of the located block to fit a region of predominantly continuous tone pixels in the image.

6. The method of claim 5 wherein said iteratively adjusting comprises decreasing a size of side adjustment increment in successive iterations.

7. The method of claim 5 wherein said iteratively adjusting comprises for an iteration, selecting whether adjusting the side of the block better fits the region based on densities of continuous tone pixels and areas of the block with and without the side adjustment and those of the side adjustment.

8. The method of claim 1 wherein said identifying regions further comprises:

when overlapping regions of high continuous tone pixel density are identified, splitting the overlapping regions into a larger number of non-overlapping regions.

9. The method of claim 1 wherein said identifying regions further comprises:

when overlapping regions of high continuous tone pixel density are identified, combining the overlapping regions into a smaller number of non-overlapping regions.

10. A computer-implemented method of compressing an image containing continuous tone content, the method comprising:

on a pixel-by-pixel basis, classifying pixels of the region as being continuous tone or non-continuous tone;

identifying continuous tone regions containing higher densities of continuous tone pixels;

compressively encoding the continuous tone regions using a first compression process suited to continuous tone image compression; and compressively encoding other regions using a second compression process.

11. The method of claim 10 wherein said classifying comprises:

producing a count of unique pixel values within a neighborhood of a pixel;

comparing the count to a threshold value; and when the count exceeds the threshold value, classifying the pixel as continuous tone.

12. The method of claim 10 wherein said identifying comprises:

determining a density of continuous tone pixels within a scan block at a plurality of locations in the image; and at locations where the scan block's continuous tone pixel density exceeds a density threshold, iteratively adjusting sides of a rectangular region encompassing the scan block to better fit about a segment of continuous tone pixels in the image according to a criteria.

13. The method of claim 12 wherein said iteratively adjusting comprises iteratively adjusting a rectangular region side at decreasing size increments.

14. The method of claim 12 wherein said identifying further comprises:

when overlapping continuous tone regions are identified, splitting the overlapping regions into a larger number of non-overlapping regions.

15. The method of claim 11 wherein said identifying further comprises:

when overlapping continuous tone regions are identified, combining the overlapping regions into a smaller number of non-overlapping regions.

16. A computer-readable medium having a computer program stored thereon executable on a computer for performing a method of segmenting continuous tone content of an image, the computer program comprising:

computer program instructions for counting, on a per pixel basis, a number of unique colors within a neighborhood of the respective pixel in the image;

computer program instructions for classifying pixels having a high number of unique colors within their neighborhood as continuous tone;

computer program instructions for calculating a density of continuous tone pixels for a plurality of regions in the image;

computer program instructions for identifying regions with a high density of continuous tone pixels as continuous tone regions; and computer program instructions for segmenting the image into the continuous tone regions and non-continuous tone regions.

17. The computer-readable medium of claim 16 wherein said computer program further comprises:

computer program instructions for compressing the segmented continuous tone regions using an encoding process suited to continuous tone image compression; and computer program instructions for compressing the non-continuous tone regions using an encoding process suited to palettized image compression.

18. The computer-readable medium of claim 17 wherein said computer program further comprises:

computer program instructions for decompressing the compressed continuous tone regions;

computer program instructions for separately decompressing the compressed non-continuous tone regions; and computer program instructions for reassembling the decompressed regions to reconstruct the image.

19. The computer-readable medium of claim 16 wherein said computer program further comprises:

computer program instructions for extracting a luminance component of the pixels; and computer program instructions for differentiating colors within a pixel's neighborhood based on the extracted luminance components of pixels in the neighborhood.

20. The computer-readable medium of claim 16 wherein said computer program further comprises:
computer program instructions for scanning the image to locate an initial size block having a high density of continuous tone pixels; and
computer program instructions for iteratively adjusting sides of the located block to fit a region of predominantly continuous tone pixels in the image.

21. The computer-readable medium of claim 20 wherein said computer program instructions for iteratively adjusting sides of the located block operates to iteratively adjust said located block sides by decreasing size increments in successive adjustment iterations.

22. The computer-readable medium of claim 16 wherein said computer program further comprises:
computer program instructions operative when overlapping regions of high continuous tone pixel density are identified, for splitting the overlapping regions into a larger number of non-overlapping regions.

23. The computer-readable medium of claim 16 wherein said computer program further comprises:
computer program instructions operative when overlapping regions of high continuous tone pixel density are identified, for combining the overlapping regions into a smaller number of non-overlapping regions.

24. A computer system comprising:
a continuous tone content segmenter operating to process pixels in an input image to detect regions having a high density of pixels having a high number of unique pixel values within the respective pixels' neighborhood;
a palettized image encoder operating to compressively encode portions of the image other than the detected regions using a palettized image compression process; and
a continuous tone image encoder operating to compressively encode the detected regions using a continuous tone image compression process; and
a multiplexer operating to combine the encoded portions and regions into a compressed output data.

25. The computer system of claim 24 wherein the continuous tone segmenter operates to detect the regions by, for a pixel in the image, checking whether a count of unique pixel values within its neighborhood exceed a count threshold, and if so, classifying the pixel as continuous tone.

26. The computer system of claim 25 wherein the continuous tone segmenter further operates to differentiate unique pixel values in the pixel's neighborhood based on luminance.

27. The computer system of claim 25 wherein the continuous tone segmenter operates to scan the image to locate an initial size block having a high density of continuous tone pixels, and to iteratively adjust sides of the located block to fit a region of predominantly continuous tone pixels in the image.

28. The computer system of claim 27 wherein the continuous tone segmenter operates to iteratively adjust sides of the located block by decreasing size increments to fit the region of predominantly continuous tone pixels in the image.

29. A computer-implemented method of decompressing a compressed data stream representing a mixed-content image with continuous tone and palettized content, the compressed data stream containing a continuous tone segment in which a region have a high density of pixels detected as having a high number of unique pixel values in the respective pixels' neighborhood is encoded using a compression type suitable for continuous tone content, the compressed data stream also containing a separate palettized content segment in which palettized content portion of the image is encoded using a compression type suitable for palettized image content, the method comprising:
decoding the continuous tone segment to reconstruct the continuous tone content region;
separately decoding the separate palettized content segment to reconstruct the palettized content portion; and
assembling the continuous tone content region and palettized portion to form an image.

30. A mixed-content image decoder for decoding a compressed data stream representing a mixed-content image with palettized and continuous tone content, the compressed data stream containing a continuous tone segment in which a region have a high density of pixels detected as having a high number of unique pixel values in the respective pixels' neighborhood is encoded using a compression type suitable for continuous tone content, the compressed data stream also containing a separate palettized content segment in which palettized content portion of the image is encoded using a compression type suitable for palettized image content, the decoder comprising:
a demultiplexer operating to separate the separately encoded continuous tone and palettized content segments from the compressed data stream;
a palettized image decoder operating to decode the separate palettized content segment to reconstruct the palettized content portion;
a continuous tone image decoder operating to decode the continuous tone segment to reconstruct the continuous tone content region; and
an image processor operating to assemble the decoded palettized content portion and the continuous tone content region into an image.

31. A computer-readable medium having computer-executable instructions stored thereon for decompressing a compressed data stream representing a mixed-content image with palettized and continuous tone content, the compressed data stream containing a continuous tone segment in which a region have a high density of pixels detected as having a high number of unique pixel values in the respective pixels' neighborhood is encoded using a compression type suitable for continuous tone content, the compressed data stream also containing a separate palettized content segment in which palettized content portion of the image is encoded using a compression type suitable for palettized image content, the method comprising:
decoding the continuous tone segment to reconstruct continuous tone content region;
separately decoding the separate palettized content segment to reconstruct the palettized content portion; and
assembling the continuous tone content region and palettized content portion into an image.

* * * * *